(12) United States Patent
Cifers

(10) Patent No.: US 10,563,813 B1
(45) Date of Patent: Feb. 18, 2020

(54) ACCESSORY MOUNTING TRACK

(71) Applicant: Luther Cifers, Amelia, VA (US)

(72) Inventor: Luther Cifers, Amelia, VA (US)

( * ) Notice: Subject to any disclaimer, the term of this patent is extended or adjusted under 35 U.S.C. 154(b) by 140 days.

(21) Appl. No.: 15/848,422

(22) Filed: Dec. 20, 2017

Related U.S. Application Data

(60) Continuation of application No. 15/083,295, filed on Mar. 29, 2016, now Pat. No. 9,879,819, which is a division of application No. 13/954,253, filed on Jul. 30, 2013, now Pat. No. 9,671,060.

(60) Provisional application No. 61/677,455, filed on Jul. 30, 2012, provisional application No. 61/680,254, filed on Aug. 6, 2012.

(51) Int. Cl.
*F16M 13/02* (2006.01)
*B21D 53/88* (2006.01)

(52) U.S. Cl.
CPC ............. *F16M 13/02* (2013.01); *B21D 53/88* (2013.01); *Y10T 29/49947* (2015.01); *Y10T 29/49948* (2015.01); *Y10T 29/49963* (2015.01); *Y10T 403/32196* (2015.01); *Y10T 403/32204* (2015.01); *Y10T 403/32229* (2015.01); *Y10T 403/32532* (2015.01); *Y10T 403/32598* (2015.01)

(58) Field of Classification Search
CPC ....... Y10T 29/49963; Y10T 29/499747; Y10T 29/79948; Y10T 403/32196; Y10T 403/32204; Y10T 403/32229; Y10T 403/32532; Y10T 403/32598; B21D 53/88; F16M 13/02
USPC .............................. 29/525.01, 525.02, 525.11
See application file for complete search history.

(56) References Cited

U.S. PATENT DOCUMENTS

| 585,475 A | 6/1897 | Huber |
| 1,705,086 A | 3/1929 | Ferguson |
| 2,157,309 A | 5/1939 | Swedman |
| 2,176,644 A | 10/1939 | Sladek |
| 2,269,847 A | 1/1942 | Feinson |
| 2,859,710 A | 11/1958 | Elsner |
| 3,208,560 A | 9/1965 | Cote |
| 3,291,088 A | 12/1966 | Klose |
| 3,331,348 A | 7/1967 | Dyer |
| 3,381,925 A | 5/1968 | Higuchi |
| 4,183,387 A | 1/1980 | Lenz |

(Continued)

FOREIGN PATENT DOCUMENTS

| FR | 2604842 A1 | 5/1988 |
| JP | 10060755 A | 3/1998 |
| JP | 2002180412 A | 6/2002 |

OTHER PUBLICATIONS

USPTO, Office Action dated Dec. 8, 2015 in related U.S. Appl. No. 13/954,253, filed Jul. 30, 2013.

(Continued)

*Primary Examiner* — Sarang Afzali
*Assistant Examiner* — Darrell C Ford
(74) *Attorney, Agent, or Firm* — Thedford I. Hitaffer; Hitaffer & Hitaffer, PLLC

(57) ABSTRACT

An accessory mounting track provides quick and easy removable attachment and positioning of various devices. The method of attachment of devices to the accessory mounting track may be compatible with the attachment of these devices to other mounting systems, allowing the accessory mounting track to be used interchangeably with those systems.

13 Claims, 3 Drawing Sheets

(56) References Cited

U.S. PATENT DOCUMENTS

| | | | |
|---|---|---|---|
| 4,244,501 A | 1/1981 | Ingram et al. | |
| 4,273,487 A | 6/1981 | McLennan | |
| 4,699,484 A | 10/1987 | Howell | |
| 4,835,852 A | 6/1989 | Asplund | |
| 4,969,784 A | 11/1990 | Yanke | |
| 5,026,013 A | 6/1991 | Robbins | |
| 5,244,186 A | 9/1993 | Chandler | |
| 5,305,700 A | 4/1994 | Strong et al. | |
| 5,421,036 A | 6/1995 | Stevens et al. | |
| 5,487,518 A | 1/1996 | McCraney | |
| 5,864,997 A | 2/1999 | Kelly | |
| 6,019,543 A | 2/2000 | Junker | |
| 6,021,984 A | 2/2000 | Mills | |
| 6,086,300 A | 7/2000 | Fröhlich | |
| 6,238,153 B1 | 5/2001 | Karrer | |
| 6,398,149 B1 | 6/2002 | Hines | |
| 6,585,465 B1 | 7/2003 | Hammond et al. | |
| 6,644,901 B2 | 11/2003 | Breckel | |
| 7,044,701 B2 | 5/2006 | Herb | |
| 7,070,374 B2 | 7/2006 | Womack et al. | |
| 7,401,995 B2 | 7/2008 | Senakiewich, II | |
| 7,497,651 B2 | 3/2009 | Harberts | |
| 7,621,487 B2 | 11/2009 | Brown | |
| 8,100,600 B2 | 1/2012 | Blum | |
| 8,647,009 B2 | 2/2014 | Kobayashi | |
| 8,974,160 B2 | 3/2015 | Bender | |
| 9,671,060 B1* | 6/2017 | Cifers | F16M 13/02 |
| 9,828,073 B1* | 11/2017 | Cifers, III | B63B 35/71 |
| 9,863,576 B1* | 1/2018 | Cifers | F16M 13/02 |
| 2001/0008600 A1 | 7/2001 | Fraleigh | |
| 2003/0156919 A1 | 8/2003 | Schwarz | |
| 2004/0131440 A1* | 7/2004 | Womack | B60P 7/0815 |
| | | | 410/104 |
| 2004/0165947 A1 | 8/2004 | Herb | |
| 2005/0269465 A1 | 12/2005 | Carnevali | |
| 2006/0175595 A1 | 8/2006 | Carnevali | |
| 2007/0194191 A1 | 8/2007 | Persson | |
| 2009/0224119 A1 | 9/2009 | Heffernan | |
| 2009/0279944 A1 | 11/2009 | Schmitz | |
| 2010/0192505 A1 | 8/2010 | Schaefer | |
| 2011/0031370 A1 | 2/2011 | Carnevali | |
| 2012/0045276 A1 | 2/2012 | Carnevali | |
| 2014/0003878 A1 | 1/2014 | Knox | |
| 2017/0089058 A1 | 3/2017 | Roth | |
| 2018/0363842 A1* | 12/2018 | Carnevali | F16M 11/14 |

OTHER PUBLICATIONS

USPTO, Office Action dated Jun. 10, 2016 in related U.S. Appl. No. 13/954,253, filed Jul. 30, 2013.
USPTO, Office Action dated Jul. 7, 2016 in related U.S. Appl. No. 13/954,253, filed Jul. 30, 2013.
USPTO, Advisory Action dated Dec. 12, 2016 in related U.S. Appl. No. 13/954,253, filed Jul. 30, 2013.
USPTO, Office Action dated Jan. 14, 2016 in related U.S. Appl. No. 13/960,772, filed Aug. 6, 2013.
USPTO, Office Action dated Jul. 12, 2016 in related U.S. Appl. No. 13/960,772, filed Aug. 6, 2013.
USPTO, Office Action dated Sep. 14, 2016 in related U.S. Appl. No. 13/960,772, filed Aug. 6, 2013.
USPTO, Office Action dated Nov. 14, 2016 in related U.S. Appl. No. 13/960,772, filed Aug. 6, 2013.
USPTO, Office Action dated May 17, 2017 in related U.S. Appl. No. 13/960,772, filed Aug. 6, 2013.
USPTO, Advisory Action dated Jul. 5, 2017 in related U.S. Appl. No. 13/960,772, filed Aug. 6, 2013.
USPTO, Office Action dated Mar. 29, 2016 in related U.S. Appl. No. 15/083,295, filed Mar. 29, 2016.
USPTO, Office Action dated Dec. 28, 2016 in related U.S. Appl. No. 15/083,295, filed Mar. 29, 2016.

* cited by examiner

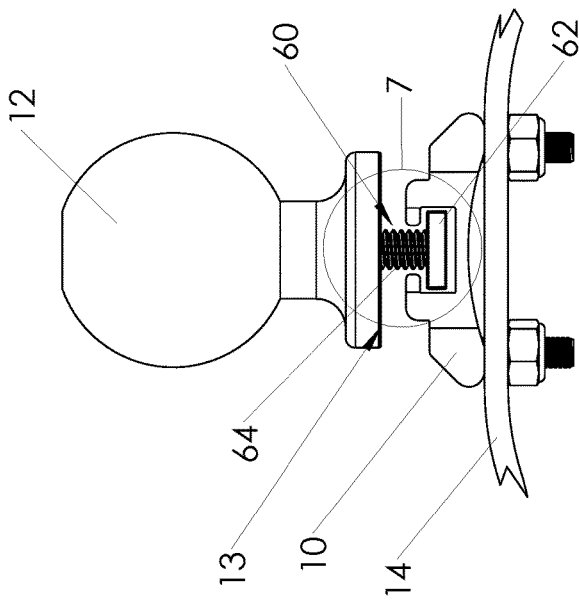
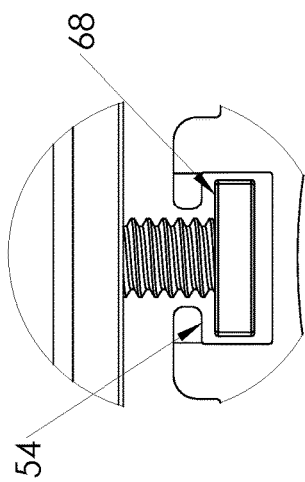
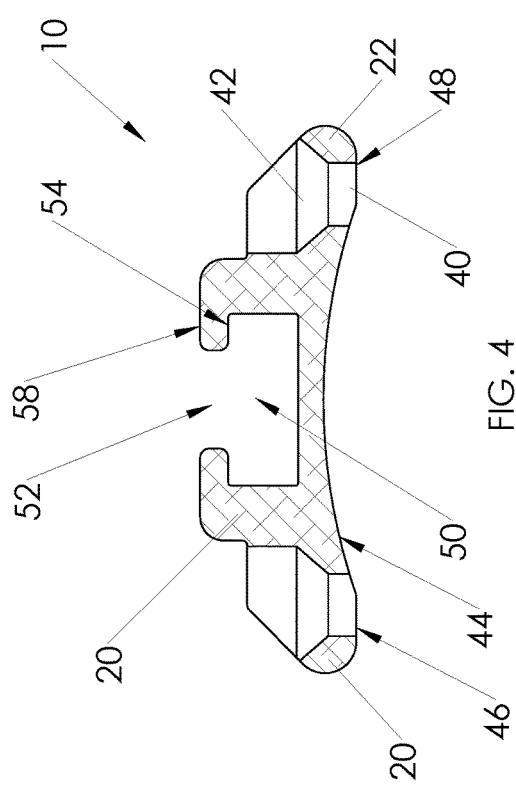
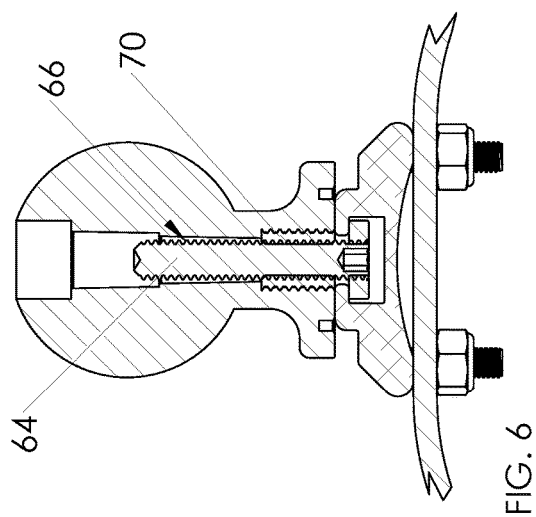

ACCESSORY MOUNTING TRACK

CROSS-REFERENCE TO RELATED APPLICATIONS

This application is a continuation of U.S. patent application Ser. No. 15/083,295, filed Mar. 29, 2016, which is a divisional of U.S. patent application Ser. No. 13/954,253, filed Jul. 30, 2013, which issued as U.S. Pat. No. 9,671,060, on Jun. 6, 2017, which claims the benefit of U.S. Provisional Application No. 61/677,455, filed Jul. 30, 2012, and U.S. Provisional Application No. 61/680,254, filed Aug. 6, 2012, the disclosures of which are incorporated herein by reference in their entirety.

BACKGROUND

This invention relates in general to the connection of accessory devices to vehicles or structures, and more particularly, to an accessory mounting track that may be fixed to an environment, providing a secure attachment point for various accessories.

Devices, such as camera mounts, fishing rod holders, personal electronics cradles, marine depth finders, visibility beacons, and various other implements, frequently require quick and easy attachment and removal from structures and vehicles, such as personal watercraft, boats, all-terrain vehicles, airplanes, automobiles, military vehicles and other vehicles and structures utilizing such devices.

In addition to these devices, other items associated with various environments are commonly stored and organized. Many other environments contain a variety of items that need to be stored or organized. Within the scope herein, the term "device" shall refer to any item that may be stored or organized in a given environment, or a bracket designed to support such an item.

In some cases, it may be desirable to alter the deployment configuration of these devices, either by arrangement or position. It may also be desirable to interchangeably attach these devices to fixed mounts and track systems, with the fixed mount providing a rigid single point of attachment and the track system providing a range of deployment positions that may be altered during attachment or while being used in the field.

These devices have long been attached using a variety of methods, including direct and non-removable attachment to the environment, or removable attachment by means of a variety of mounting systems. While track systems have been utilized in some applications, they generally require tracks specifically designed for or fabricated into the vehicle or structure. The designs of these tracks make them unsuitable for surface mounting to environmental surfaces not designed to accept such a track and as a result are unstable and inadequate for such installations.

While there are existing methods of removable attachment for these devices, the scope of compatibility for those methods may be generally limited by the design of the attachment method, which may inhibit aforementioned versatility in deployment of the devices.

There remains a need for an accessory track that provides a secure means of removable attachment, utilizing a small profile designed for surface mounting.

SUMMARY

The present invention relates to an accessory mounting track that provides quick and easy removable attachment and positioning of various devices. The method of attachment of devices to the accessory mounting track may be compatible with the attachment of these devices to other mounting systems, allowing the accessory mounting track to be used interchangeably with those systems.

Various advantages of this invention will become apparent to those skilled in the art from the following detailed description of the preferred embodiment, when read in light of the accompanying drawings.

BRIEF DESCRIPTION OF THE DRAWINGS

FIG. 4 is an enlarged cross-sectional view taken along the line 4-4 in FIG. 3.

FIG. 5 is a partially exploded end view of the components shown in FIG. 1.

FIG. 6 is similar to FIG. 5 except it is not exploded and is shown at a section cut through the center of the device.

FIG. 7 is an enlarged view of the detail referenced as 7 in FIG. 5.

DETAILED DESCRIPTION OF THE PREFERRED EMBODIMENT

Figure 1:
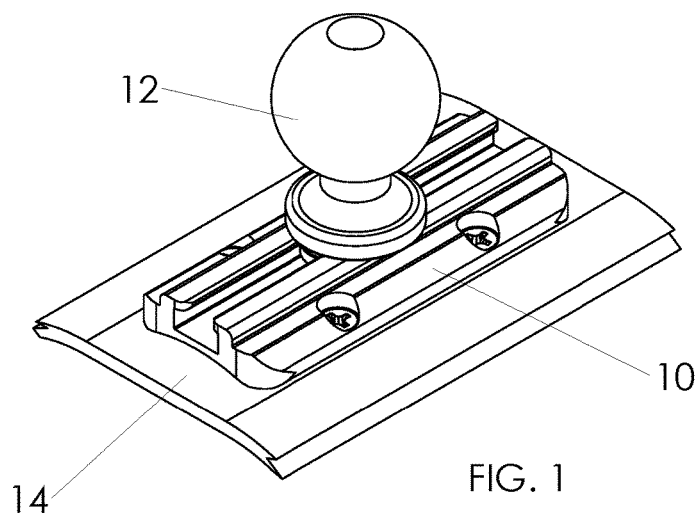
FIG. 1 is a perspective view of an accessory mounting track attached to a supporting environmental surface with a device attached to the accessory mounting track.

Referring now to the drawings, there is illustrated in FIG. 1 an accessory mounting track 10 for removably attaching a device 12 or multiple devices to a supporting environmental surface 14. Exemplary devices are shown in U.S. patent application Ser. No. 13/897,916, filed May 20, 2013, entitled Monopod Turret Support, and U.S. patent application Ser. No. 13/476,441, filed May 21, 2012, published as US Patent Application Publication No. 2012/0293990, entitled Fold-Up Beacon and Associated Post for Vehicles, the disclosures of which are incorporated herein by reference. An additional device is disclosed for example in U.S. Provisional Application No. 61/680,254, entitled Accessory Mounting System.

It shall be observed that the device 12 shown is an example (e.g., a ball for a ball and socket mounting system) of a device that may be attached to the accessory mounting track 10, but a number of devices of many sizes, shapes, and uses, or brackets designed to clamp or support such devices, could be used instead of or in addition to the device 12. The depiction of the device 12 shall not in any way be construed as a limitation as to the size, shape, or type of device that could be attached to the accessory mounting track 10.

The supporting environmental surface may be part of a vehicle, such as a boat or kayak, for example. The supporting environmental surface may alternately be part of a structure, such as a wall in a building or an armrest of a tree stand, for example. It shall be observed that the supporting environmental surface 14 is a graphical representation of an example of such a surface, but that it does not limit in any way the size, shape, or configuration of possible supporting environmental surfaces or the method of attachment to such surfaces.

Figure 2:
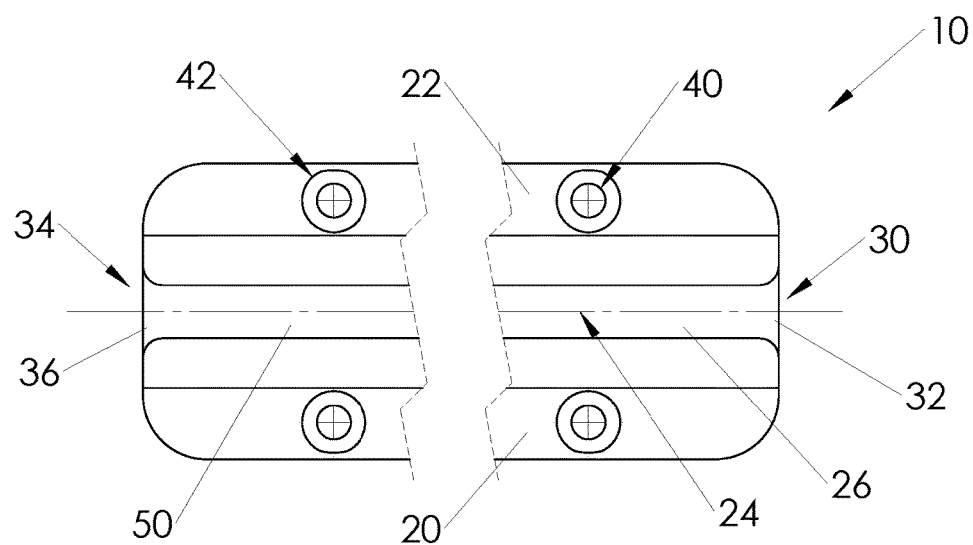
FIG. 2 is a top plan view of an accessory mounting track.
Figure 3:
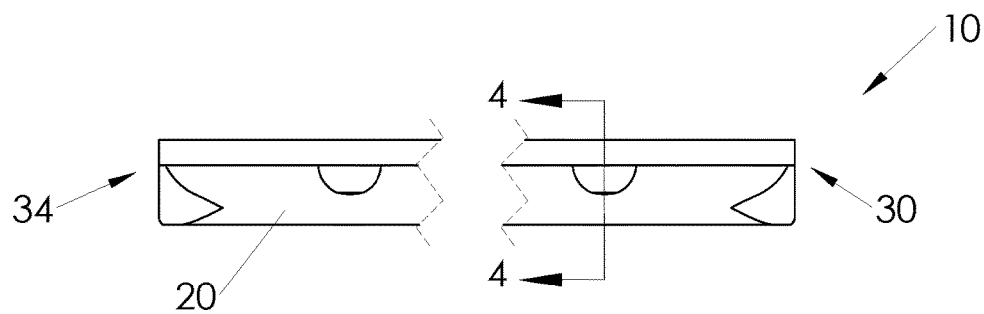
FIG. 3 is an elevational view of the accessory mounting track shown in FIG. 2.

Referring now to FIG. 2, the accessory mounting track 10 may be comprised of a left support flange 20, a right support flange 22, and a central axis 24, which is substantially parallel to a slot channel 50. The accessory mounting track 10 may also comprise a proximal end 30 and a distal end 34 with a proximal slot entry point 32 and a distal slot entry point 36.

It may be mentioned at this point that, for the scope of this entire disclosure, orientation terms, such as "proximal" and "distal" or "left" and "right", refer to their subject matter as semantic conveniences only and not as a necessary condition of the accessory mounting track 10, as the accessory mounting track 10 may obviously be utilized in any desired position or orientation.

The accessory mounting track 10 may also comprise attachment holes 40 linearly disposed parallel to the central axis 24 near the outermost edges of the left support flange 20 and the right support flange 22. The attachment holes 40 may have a countersink feature 42 or a counter bore feature (not shown).

Referring now to FIG. 4, the accessory mounting track 10 may have a concave recess 44, which may terminate at a left interface flat 46 and a right interface flat 48 on the bottom of the left support flange 20 and right support flange 22, respectively. The left interface flat 46 and right interface flat 48 may be approximately aligned with the attachment holes 40 in the corresponding left support flange 20 and right support flange 22. This arrangement may maximize the opportunity for the left interface flat 46 and the right interface flat 48 to have firm contact with the supporting environmental surface 14. Because of the relatively wide spacing between the left interface flat 46 and right interface flat 48, high lateral stability may be achieved. The concave recess 44 may minimize the opportunity for a curved or irregular supporting environmental surface 14 to make contact in regions between the left interface flat 46 and right interface flat 48.

The accessory mounting track 10 may also comprise a slot channel 50, which may have a slot opening 52, which may be bounded on each side by a containment ledge 54.

Referring now to FIG. 5, a device 12 is shown being attached to the accessory mounting track 10. There is a tee-bolt 60 comprising a head 62 and a stud 64 threaded into the device 12. The tee-bolt 60 is in the slot channel 50, oriented so that the stud 64 is in the slot opening 52. In the state shown in FIG. 5, the device 12 may be positioned along the central axis 24 (shown in FIG. 2), with the slot channel 50 containing the tee-bolt 60 within it, but not preventing movement along the central axis 24.

Looking now at FIG. 6, the device 12 is shown after being fully installed on the accessory mounting track 10. The device 12 has female threads 70, which are threaded onto the stud 64 of the tee-bolt 60.

Figure 8:
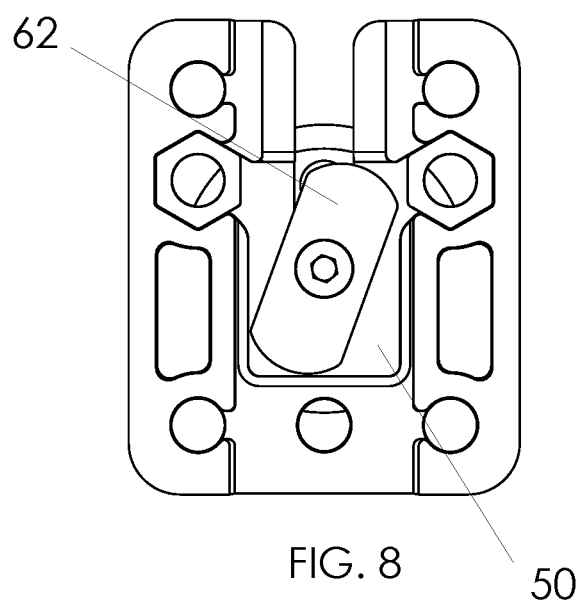
FIG. 8 is a bottom plan view of an embodiment of the accessory mounting track showing a head of a tee-bolt in a slot channel.

As shown in FIG. 8, the tee-bolt 60 has a head 62 that is elongated so as to have a length and a width, wherein the length is greater in dimension than the width so that the head 62 of the tee-bolt 60 is unable to rotate a full rotation in the slot channel 50. That is to say, opposite sides of the slot channel 50 serve as a mechanical restraint, restricting rotation of the head 62 of the tee-bolt 60. It should be appreciated that by rotating the device 12, the threads 66 of the stud 64 interact with the female threads 70, which may urge the device 12 towards or away from the head 62 of the tee-bolt 60, depending on the direction of rotation. When appropriately rotated, the device 12 is urged towards the head 62 of the tee-bolt 60 until the mounting surface 13 of the device 12 makes contact with the track upper surface 58 (shown in FIG. 4) of the accessory mounting track 10 and the head upper surface 68 makes contact with the containment ledge 54. When the device is turned further, friction is increased between these surfaces, which effectively locks the device 12 in position. By rotating the device 12 in the opposite direction, the friction is eliminated and the device 12 may once again be positioned along the central axis 24, or removed from the track through the slot opening or by sliding it out of either end of the accessory mounting track 10.

The accessory mounting track 10 may comprise an extruded profile with attachment holes 40. The length of the track 10 may vary as may the number of attachment holes 40. The attachment holes 40 may be disposed linearly near the outer edges of the track 10 or linearly, approximately centered and along the longest axis of the track 10. The attachment holes 40 may be of counter bore or countersink type, or may be simple thru holes. The recess 44 may be concave, angular, or another shape, allowing clearance for attaching to rounded or irregular surfaces and maximizing stability by enabling the supporting environment to make contact with the track 10 along the edges. The region near the outer edges of the underside of the track 10 may be flat and approximately aligned with the rows of attachment holes 40 to maximize lateral stability.

The track 10 composition may be of a lightweight material, such as aluminum or plastic, or a composite comprising two or more such materials. The surface of the track 10 may be treated for harsh environmental exposure, such as UV radiation and saltwater. The upper surface of the track 10 may be textured with any suitable texture to improve the gripping characteristics of that surface, which may increase resistance to accessories mounted to that surface from slipping either by rotation or linearly along the axis of the track 10. This texture may be the result of geometry in the track shape, such as ridges or grooves in the surface. Alternately or in addition to this geometry, the texture may be the result of etching, application of plastic or rubberized coating, or other surface treatments.

Attachment of the track 10 to the support surface may be achieved by putting screws or other suitable fasteners through one or more of the attachment holes 40 and into the surface on which the track 10 is to be mounted. In some configurations, the track 10 may be attached to an adapter bracket, such as a rail clamp, for attachment to the environment, or molded or integrated into the support surface.

The track profile may contain an internal C-shaped slot or other suitable shape to receive a tee-bolt, sliding nut, or other connecting feature internally with which to attach accessory devices.

The tee-bolt 60 may be attached to the device 12 by screwing the threaded stud 64 of the tee-bolt 60 into the device 12, leaving the head 62 of the tee-bolt 60 extended some distance from the device 12.

Attachment of the device 12 to the track 10 may be achieved by inserting the head 62 of the tee-bolt 60 into a slot opening 52. The C-shape of the slot 50 may captivate the head 62 of the tee-bolt 10, allowing movement only along the long axis of the track 10. Once positioned, the device 12 may be immovably tightened to the track 10 by rotating the device 12. The interaction between the threads in the device 12 and those on the stud 64 urges the head 62 of the tee-bolt 60 towards the device 12, thus causing the head 62 of the tee-bolt 60 to make contact with the inside of the slot 50 and causing the device 12 to make contact with the upper surface of the track 10 opposite of the slot 50. Further rotation of the device 12 creates pressure on these areas of contact, the resulting friction of which, with reasonable tightening force, is adequate to inhibit rotation of the device 12 in either the tightening or the loosening direction or from slipping linearly along the track 10. As previously mentioned, texture on the mounting surface of the track 10 may increase this friction.

It should be understood that although a tee-bolt attachment method is depicted in these drawings, other methods of secure and removable attachment of devices to the accessory mounting track 10 may also be used. For example, in an alternate configuration, a slot nut and stud configuration (not shown) may be used instead of a tee-bolt. In this configuration, the slot nut is inserted into the slot 50 instead of the head of the tee-bolt. The slot nut is not permanently attached to the stud as it is in the tee-bolt configuration, but instead has female threads which interact with a stud, resulting in a tightening effect that is to that of the tee-bolt configuration.

In applications in which excessive rotational forces may be applied to the device 12, an external locking mechanism (not shown) may be used to prevent the device 12 from rotating in the loosening direction. Also, mechanical features (e.g. grooves, serration, or teeth) may be incorporated into some surface on or surfaces on the track that cooperate with corresponding features on the device 12, or that encourage increased friction between the track and the device.

On the sides of the track there may be grooves in a dovetail, radial, or other shape (not shown), which may allow attachment of devices by externally clamping the track 12, in cooperation with or independent of the C-shaped slot 50 described above. In this application, the device 12 may have features that cooperate with the grooves so that when it is tightened, the features in the device 12 will mechanically interlock with the grooves.

The ends of the track 10 may be contoured to remove edges that may cause injury or snags or may be angled in such a way that interference of gear, persons or other external items is minimized.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of removably attaching and positioning of one or more accessory devices to a supporting surface comprising the steps of:
    a) providing a track configured for mounting to the supporting surface, the track provided with a mounting surface and a bottom, a slot channel having a slot opening in the mounting surface, and a recess in the bottom for allowing clearance for a rounded or irregular surface of the support surface, wherein the recess in the bottom is opposite the channel,
    b) providing at least one tee-bolt having a head on one end and a threaded stud on another end,
    c) inserting the head of the at least one tee-bolt into the track with the threaded stud extending through the slot opening,
    d) threading the threaded stud of the tee-bolt into threads of an accessory device,
    e) rotating the accessory device to in turn rotate the at least one tee-bolt in the slot channel until the head of the at least one tee-bolt contacts at least one of opposing surfaces of the slot channel to prevent further rotation of the at least one tee-bolt, yet allowing movement of the accessory device and the at least one tee-bolt along a long central axis of the track,
    f) tightening the accessory device to the track by rotating the accessory device so that interaction between threads in the accessory device and threads on the at least one tee-bolt urges the head of the at least one tee-bolt towards the accessory device, thus causing the head of the at least one tee-bolt to contact an inside surface of the slot channel opposite the mounting surface and causing the accessory device to contact the mounting surface on an opposite side of the slot channel, and
    g) further rotating the accessory device to increase pressure on the slot channel and the mounting surface, resulting in friction that, with tightening force, is adequate to inhibit rotation of the accessory device in either a tightening or a loosening direction or inhibit the accessory device from slipping linearly along the track.

2. The method of claim 1, wherein the at least one tee-bolt is in the slot channel, oriented so that the threaded stud is in the slot opening.

3. The method of claim 1, wherein the accessory device is positionable along the long central axis, with the slot channel containing the at least one tee-bolt therein, but not preventing movement of the at least one tee-bolt along the long central axis when the accessory device is not tightened to make contact with the mounting surface.

4. The method of claim 1, wherein the mounting surface has a texture surface to increase the friction.

5. The method of claim 4, wherein the texture surface is selected from a group of textures consisting essentially of grooves, serrations, and teeth on the mounting surface of the track that cooperate with a corresponding texture surface on the accessory device.

6. The method of claim 1, wherein the track composition is a lightweight material selected from a group consisting essentially of aluminum and plastic, and the mounting surface of the track is treated for harsh environmental exposure.

7. The method of claim 1, wherein the track comprises attachment holes disposed along the track near outermost edges of the track, the method further comprising a mounting step comprising the step of putting fasteners through the attachment holes and into a supporting surface on which the track is mounted.

8. The method of claim 7, wherein the supporting surface is a surface selected from a group of surfaces consisting essentially of a boat surface and a kayak surface.

9. The method of claim 1, wherein the accessory device is a ball and the threads in the accessory device are female threads.

10. The method of claim 9, wherein the ball forms a part of a ball and socket mounting system.

11. The method of claim 1, wherein the accessory device is a device selected from a group of devices consisting essentially of a camera mount, a fishing rod holder, a personal electronics cradle, a marine depth finder, and a visibility beacon.

12. A method of removably attaching and positioning of one or more accessory devices to a supporting surface comprising the steps of:
    a) providing a track configured for mounting to the supporting surface, the track provided with a mounting surface and a bottom, a slot channel having a slot opening in the mounting surface, and a recess in the bottom for allowing clearance for a rounded or irregular surface of the support surface, wherein the recess in the bottom is opposite the channel,
    b) providing at least one tee-bolt having a head on one end and threaded stud on another end, c) inserting the head of the at least one tee-bolt into the track with threaded stud extending through a slot opening,
d) threading the threaded stud of the at least one tee-bolt into threads of an accessory device, wherein the accessory device is of unitary construction, having no moveable component supporting the threads of the accessory device,
e) rotating the accessory device to in turn rotate the at least one tee-bolt in a slot channel until the head of the at least one tee-bolt contacts at least one of opposing surfaces of the slot channel to prevent further rotation of the at least one tee-bolt, yet allowing movement of the accessory device and the at least one tee-bolt along a long central axis of the track,
f) tightening the accessory device to the track by rotating the accessory device so that interaction between threads in the accessory device and threads on the at least one tee-bolt urges the head of the at least one tee-bolt towards the accessory device, thus causing the head of the at least one tee-bolt to contacts an inside surface of the slot channel opposite a mounting surface and causing the accessory device to contact the mounting surface on an opposite side of the slot channel, and
g) further rotating the accessory device to increase pressure on the slot channel and the mounting surface, resulting in friction that, with tightening force, is adequate to inhibit rotation of the accessory device in either a tightening or a loosening direction or inhibit the accessory device from slipping linearly along the track.

13. A method of removably attaching and positioning of one or more accessory devices to a supporting surface comprising the steps of:
a) providing a track with a mounting surface and a bottom, a slot channel with a slot opening in the mounting surface, and a recess in the bottom for allowing clearance for a rounded or irregular surface of the support surface, wherein the recess in the bottom is opposite the channel,
b) providing at least one tee-bolt having a head on one end and a threaded stud on another end,
c) screwing the threaded stud into an accessory device, leaving the head extended some distance from the accessory device,
d) inserting the head into the slot opening,
e) rotating the at least one tee-bolt in the slot channel until the head comes into contact with at least one of opposing surfaces of the slot channel to prevent further rotation of the at least one tee-bolt, allowing movement of the at least one tee-bolt along a long central axis of the track,
f) tightening the accessory device to the track by rotating the accessory device so that interaction between threads in the accessory device and threads on the at least one tee-bolt urges the head towards the accessory device, thus causing the head to make contact with an inside surface of the slot channel opposite the mounting surface and causing the accessory device to make contact with the mounting surface on an opposite side of the slot channel, and
g) further rotating the accessory device to increase pressure on the slot channel and the mounting surface, resulting in friction that, with tightening force, is adequate to inhibit accidental rotation of the accessory device in either a tightening or a loosening direction or inhibit the accessory device from slipping linearly along the track.

\* \* \* \* \*